(12) United States Patent
Robbins

(10) Patent No.: US 10,192,358 B2
(45) Date of Patent: Jan. 29, 2019

(54) AUTO-STEREOSCOPIC AUGMENTED REALITY DISPLAY

(71) Applicant: Microsoft Technology Licensing, LLC, Redmond, WA (US)

(72) Inventor: Steven John Robbins, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 13/722,917

(22) Filed: Dec. 20, 2012

(65) Prior Publication Data

US 2014/0176528 A1 Jun. 26, 2014

(51) Int. Cl.
*G06T 19/00* (2011.01)
*G02B 27/22* (2018.01)
(Continued)

(52) U.S. Cl.
CPC ........ *G06T 19/006* (2013.01); *G02B 27/0093* (2013.01); *G02B 27/0103* (2013.01);
(Continued)

(58) Field of Classification Search
CPC ................ G02B 5/1828; G02B 27/225; G02B 27/0103; G02B 27/0093; G02B 2027/0174; G02B 2027/0134; G06T 19/006; H04N 13/0402; H04N 13/0472; H04N 13/0477; H04N 13/0484; H04N 13/371; H04N 13/376; H04N 13/383; H04N 13/302
(Continued)

(56) References Cited

U.S. PATENT DOCUMENTS 3,410,774 A 11/1968 Barson et al.
3,836,258 A 9/1974 Courten et al.
(Continued)

FOREIGN PATENT DOCUMENTS

AU 2011204946 12/2011
CN 1440513 9/2003
(Continued)

OTHER PUBLICATIONS

"Advisory Action", U.S. Appl. No. 13/428,879, dated Sep. 19, 2014, 3 pages.
(Continued)

*Primary Examiner* — Christopher S Kelley
*Assistant Examiner* — Matthew K Kwan
(74) *Attorney, Agent, or Firm* — NovoTechIP International PLLC

(57) ABSTRACT

In embodiments of an auto-stereoscopic augmented reality display, the display device is implemented with an imaging structure that includes a waveguide for see-through viewing of an environment. The waveguide also transmits light of a virtual image that is generated as a near-display object to appear at a distance in the environment. The imaging structure includes switchable diffractive elements that are integrated in the waveguide and configured in display zones. The switchable diffractive elements are switchable to independently activate the display zones effective to correct for an accurate stereopsis view of the virtual image that appears at the distance in the environment.

19 Claims, 5 Drawing Sheets

(51) Int. Cl.
*G02B 27/01* (2006.01)
*G02B 27/00* (2006.01)
*H04N 13/302* (2018.01)
*H04N 13/376* (2018.01)
*H04N 13/371* (2018.01)
*H04N 13/383* (2018.01)
*G02B 5/18* (2006.01)

(52) U.S. Cl.
CPC ......... *G02B 27/225* (2013.01); *H04N 13/302* (2018.05); *H04N 13/371* (2018.05); *H04N 13/376* (2018.05); *H04N 13/383* (2018.05); *G02B 5/1828* (2013.01); *G02B 2027/0134* (2013.01); *G02B 2027/0174* (2013.01)

(58) Field of Classification Search
USPC ............................................. 348/55; 345/419
See application file for complete search history.

(56) References Cited

U.S. PATENT DOCUMENTS

| | | |
|---|---|---|
| 3,906,528 A | 9/1975 | Johnson |
| 3,971,065 A | 7/1976 | Bayer |
| 4,711,512 A | 12/1987 | Upatnieks |
| 4,822,145 A | 4/1989 | Staelin |
| 4,860,361 A | 8/1989 | Sato et al. |
| 4,957,351 A | 9/1990 | Shioji |
| 5,019,808 A | 5/1991 | Prince et al. |
| 5,146,355 A | 9/1992 | Prince et al. |
| 5,252,950 A | 10/1993 | Saunders et al. |
| 5,309,169 A | 5/1994 | Leppert |
| 5,359,444 A | 10/1994 | Piosenka et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,777,715 A | 7/1998 | Kruegle et al. |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A * | 8/2000 | Popovich ........................ 359/15 |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 * | 12/2002 | Takigawa et al. ............. 348/42 |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |

(56) References Cited

U.S. PATENT DOCUMENTS

| | | |
|---|---|---|
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,913,004 B1 * | 12/2014 | Bozarth ............ G06K 9/00604 345/156 |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,368,546 B2 | 6/2016 | Fleck et al. |
| 9,558,590 B2 | 1/2017 | Westerinen et al. |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 9,779,643 B2 | 10/2017 | Bohn et al. |
| 9,807,381 B2 | 10/2017 | Flek et al. |
| 2001/0043208 A1 | 11/2001 | Furness, III et al. |
| 2002/0015110 A1 | 2/2002 | Brown Elliott |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0012341 A1 | 1/2004 | Hyuga |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2005/0286125 A1 | 12/2005 | Sundstrom et al. |
| 2006/0018025 A1 | 1/2006 | Sharon et al. |
| 2006/0032616 A1 | 2/2006 | Yang |
| 2006/0038881 A1 * | 2/2006 | Starkweather et al. ........ 348/51 |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 * | 6/2006 | Unkrich ........................ 348/51 |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0164988 A1 | 7/2007 | Ryu et al. |
| 2007/0177260 A1 | 8/2007 | Kuppenheimer et al. |
| 2007/0236959 A1 | 10/2007 | Tolbert |
| 2007/0284093 A1 | 12/2007 | Bhatti et al. |
| 2008/0007511 A1 * | 1/2008 | Tsuboi ............... G02B 27/2214 345/102 |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |

(56) References Cited

U.S. PATENT DOCUMENTS

| | | |
|---|---|---|
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Seesselberg et al. |
| 2010/0141905 A1 | 6/2010 | Burke |
| 2010/0149073 A1* | 6/2010 | Chaum et al. .................. 345/8 |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1* | 9/2010 | Bjelkhagen et al. ........... 348/45 |
| 2010/0238664 A1 | 9/2010 | Theodorus et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0149201 A1 | 6/2011 | Powell et al. |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0102438 A1* | 4/2012 | Robinson ................ G06F 3/011 715/863 |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0127577 A1 | 5/2012 | Desserouer |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1* | 8/2012 | Johansson ..................... 345/156 |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0155070 A1 | 6/2013 | Luo |
| 2013/0162673 A1 | 6/2013 | Bohn |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1* | 8/2013 | Robinson ................ G06F 3/013 345/158 |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin |
| 2013/0242056 A1 | 9/2013 | Fleck |
| 2013/0242555 A1 | 9/2013 | Mukawa |
| 2013/0250431 A1 | 9/2013 | Robbins et al. |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |

(56) References Cited

U.S. PATENT DOCUMENTS

| | | |
|---|---|---|
| 2014/0041827 A1 | 2/2014 | Giaimo |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0184699 A1 | 7/2014 | Ito et al. |
| 2014/0204455 A1 | 7/2014 | Popovich et al. |
| 2014/0240842 A1 | 8/2014 | Nguyen et al. |
| 2014/0320399 A1 | 10/2014 | Kim et al. |
| 2015/0168731 A1 | 6/2015 | Robbins |
| 2015/0227231 A1 | 8/2015 | Chen |
| 2016/0033697 A1 | 2/2016 | Sainiemi et al. |
| 2016/0035539 A1 | 2/2016 | Sainiemi et al. |
| 2016/0231570 A1 | 8/2016 | Levola et al. |
| 2016/0234485 A1 | 8/2016 | Robbins et al. |
| 2016/0282625 A1 | 9/2016 | Fleck et al. |
| 2017/0140577 A1 | 5/2017 | Westerinen et al. |
| 2017/0163977 A1 | 6/2017 | Fleck et al. |
| 2017/0301270 A1 | 10/2017 | Bohn et al. |
| 2017/0326446 A1 | 11/2017 | Robbins et al. |

FOREIGN PATENT DOCUMENTS

| | | |
|---|---|---|
| CN | 101029968 | 9/2007 |
| CN | 101589326 | 11/2009 |
| CN | 201491069 | 5/2010 |
| CN | 101881936 | 11/2010 |
| CN | 102004315 | 4/2011 |
| CN | 102096235 | 6/2011 |
| CN | 102156555 | 8/2011 |
| DE | 102007021036 | 11/2008 |
| EP | 0959378 | 11/1999 |
| EP | 0977022 | 2/2000 |
| EP | 1494109 | 1/2005 |
| EP | 1748370 | 1/2007 |
| EP | 2065750 | 6/2009 |
| EP | 2112547 A2 | 10/2009 |
| EP | 2216678 | 1/2010 |
| EP | 2700987 | 2/2014 |
| EP | 3018524 | 5/2016 |
| JP | H02227340 | 9/1990 |
| JP | H0422358 | 1/1992 |
| JP | 7311303 | 11/1995 |
| JP | H08163602 | 6/1996 |
| JP | H08190640 | 7/1996 |
| JP | 2000013818 | 1/2000 |
| JP | 2000276613 | 10/2000 |
| JP | 2001078234 | 3/2001 |
| JP | 2002358032 | 12/2002 |
| JP | 2002365589 | 12/2002 |
| JP | 2003005128 | 1/2003 |
| JP | 2004219664 | 8/2004 |
| JP | 2005309638 | 11/2005 |
| JP | 2006195333 | 7/2006 |
| JP | 2006267887 | 10/2006 |
| JP | 2006349921 | 12/2006 |
| JP | 2008015125 | 1/2008 |
| JP | 2008017135 | 1/2008 |
| JP | 2008097599 | 4/2008 |
| JP | 2008518368 | 5/2008 |
| JP | 2009187290 | 8/2009 |
| JP | 201061545 | 3/2010 |
| JP | 2012042654 | 3/2012 |
| KR | 20090076539 | 7/2009 |
| KR | 20110070087 | 6/2011 |
| KR | 20120023458 | 3/2012 |
| TW | 200846700 | 12/2008 |
| WO | WO-9418595 | 8/1994 |
| WO | WO-2001033282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | 2010/125337 A2 | 11/2010 |
| WO | WO-2011003381 | 1/2011 |
| WO | WO-2011041466 | 4/2011 |
| WO | WO-2011051660 | 5/2011 |
| WO | WO-2011090455 | 7/2011 |
| WO | 2011/110728 A1 | 9/2011 |
| WO | WO-2011106797 | 9/2011 |
| WO | WO-2011131978 | 10/2011 |
| WO | WO-2012172295 | 12/2012 |
| WO | WO-2013093906 | 6/2013 |
| WO | WO-2013164665 | 11/2013 |
| WO | WO-2014130383 | 8/2014 |

OTHER PUBLICATIONS

"BragGrate Mirror", Retrieved from <http://web.archive.org/web/20090814104232/http://www.optigrate.com/BragGrate_Mirror.html> on Jul. 8, 2014, Aug. 14, 2009, 2 pages.

"Corrected Final Office Action", U.S. Appl. No. 13/432,311, dated Dec. 24, 2014, 25 pages.

"Corrected Notice of Allowance", U.S. Appl. No. 13/355,836, dated Sep. 11, 2014, 2 pages.

"Corrected Notice of Allowance", U.S. Appl. No. 13/355,836, dated Dec. 15, 2014, 2 pages.

"Final Office Action", U.S. Appl. No. 13/336,873, dated Jan. 5, 2015, 21 pages.

"Final Office Action", U.S. Appl. No. 13/336,895, dated May 27, 2014, 11 pages.

"Final Office Action", U.S. Appl. No. 13/355,836, dated Mar. 10, 2014, 18 pages.

"Final Office Action", U.S. Appl. No. 13/355,914, dated Feb. 23, 2015, 21 pages.

"Final Office Action", U.S. Appl. No. 13/355,914, dated Jun. 19, 2014, 11 pages.

"Final Office Action", U.S. Appl. No. 13/397,495, dated May 29, 2014, 10 pages.

"Final Office Action", U.S. Appl. No. 13/397,516, dated Jan. 29, 2015, 13 pages.

"Final Office Action", U.S. Appl. No. 13/428,879, dated Jul. 14, 2014, 12 pages.

"Final Office Action", U.S. Appl. No. 13/432,311, dated Dec. 15, 2014, 24 pages.

"Final Office Action", U.S. Appl. No. 13/432,372, dated Jan. 29, 2015, 33 pages.

"Final Office Action", U.S. Appl. No. 13/440,165, dated Jun. 6, 2014, 12 pages.

"Final Office Action", U.S. Appl. No. 13/477,646, dated Feb. 23, 2015, 36 pages.

"Final Office Action", U.S. Appl. No. 13/477,646, dated May 5, 2014, 26 pages.

"Final Office Action", U.S. Appl. No. 13/525,649, dated Oct. 9, 2014, 8 pages.

"Final Office Action", U.S. Appl. No. 14/134,993, dated Aug. 20, 2014, 15 pages.

"Foreign Notice of Allowance", CN Application No. 201320034345.X, dated Aug. 14, 2013, 2 Pages.

"Foreign Office Action", CN Application No. 201210563730.3, dated Jan. 7, 2015, 16 pages.

"Foreign Office Action", CN Application No. 201210567932.5, dated Aug. 14, 2014, 12 pages.

"HDTV Helmet Mounted Display", Available at <http://defense-update.com/products/h/HDTV-HMD.htm>,Jan. 26, 2005, 1 page.

"International Search Report and Written Opinion", Application No. PCT/US2014/016658, 10 pages.

"International Search Report and Written Opinion", Application No. PCT/US2012/069331, dated Mar. 29, 2013, 10 pages.

"International Search Report and Written Opinion", Application No. PCT/US2013/053676, dated Oct. 16, 2013, 10 pages.

"International Search Report and Written Opinion", Application No. PCT/US2013/030632, dated Jun. 26, 2013, 10 pages.

(56) References Cited

OTHER PUBLICATIONS

"International Search Report and Written Opinion", Application No. PCT/US2013/028477, dated Jun. 21, 2013, 11 pages.
"International Search Report and Written Opinion", Application No. PCT/US2013/031111, dated Jun. 26, 2013, 11 pages.
"International Search Report and Written Opinion", Application No. PCT/US2013/061225, dated Jun. 4, 2014, 12 pages.
"International Search Report and Written Opinion", Application No. PCT/US2012/071563, dated Apr. 25, 2013, 13 pages.
"International Search Report and Written Opinion", Application No. PCT/US2013/021784, dated Apr. 30, 2013, 9 pages.
"International Search Report and Written Opinion", Application No. PCT/US2012/069330, dated Mar. 28, 2013, 9 pages.
"International Search Report and Written Opinion", Application No. PCT/US2013/021783, dated May 15, 2013, 9 pages.
"International Search Report and Written Opinion", Application No. PCT/US2013/026200, dated Jun. 3, 2013, 9 pages.
"Light Guide Techniques using LED Lamps", Application Brief I-003, retrieved from <http://www.ciri.org.nz/downloads/Lightpipe%20design.pdf> on Jan. 12, 2012,Oct. 14, 2008, 22 pages.
"Non-Final Office Action", U.S. Appl. No. 13/397,495, dated Nov. 13, 2013, 8 pages.
"Non-Final Office Action", U.S. Appl. No. 13/440,165, dated Feb. 6, 2014, 12 pages.
"Non-Final Office Action", U.S. Appl. No. 13/336,873, dated Jul. 25, 2014, 16 pages.
"Non-Final Office Action", U.S. Appl. No. 13/336,895, dated Oct. 24, 2013, 9 pages.
"Non-Final Office Action", U.S. Appl. No. 13/343,675, dated Jul. 16, 2013, 9 pages.
"Non-Final Office Action", U.S. Appl. No. 13/355,836, dated Nov. 4, 2013, 15 pages.
"Non-Final Office Action", U.S. Appl. No. 13/355,914, dated Feb. 14, 2014, 10 pages.
"Non-Final Office Action", U.S. Appl. No. 13/355,914, dated Oct. 28, 2014, 18 pages.
"Non-Final Office Action", U.S. Appl. No. 13/397,516, dated Jun. 12, 2014, 11 pages.
"Non-Final Office Action", U.S. Appl. No. 13/397,516, dated Nov. 25, 2013, 10 pages.
"Non-Final Office Action", U.S. Appl. No. 13/397,539, dated Mar. 16, 2015, 9 pages.
"Non-Final Office Action", U.S. Appl. No. 13/397,617, dated Oct. 9, 2014, 6 pages.
"Non-Final Office Action", U.S. Appl. No. 13/428,879, dated Feb. 24, 2015, 10 pages.
"Non-Final Office Action", U.S. Appl. No. 13/428,879, dated Mar. 17, 2014, 10 pages.
"Non-Final Office Action", U.S. Appl. No. 13/432,311, dated Jul. 8, 2014, 33 pages.
"Non-Final Office Action", U.S. Appl. No. 13/432,372, dated May 9, 2014, 26 pages.
"Non-Final Office Action", U.S. Appl. No. 13/432,372, dated Oct. 24, 2014, 27 pages.
"Non-Final Office Action", U.S. Appl. No. 13/440,165, dated Feb. 13, 2015, 10 pages.
"Non-Final Office Action", U.S. Appl. No. 13/440,165, dated Oct. 16, 2014, 11 pages.
"Non-Final Office Action", U.S. Appl. No. 13/477,646, dated Oct. 6, 2014, 34 pages.
"Non-Final Office Action", U.S. Appl. No. 13/477,646, dated Nov. 22, 2013, 20 pages.
"Non-Final Office Action", U.S. Appl. No. 13/525,649, dated Jan. 29, 2014, 7 pages.
"Non-Final Office Action", U.S. Appl. No. 13/525,649, dated Feb. 5, 2015, 7 pages.
"Non-Final Office Action", U.S. Appl. No. 13/525,649, dated Jun. 5, 2014, 7 pages.
"Non-Final Office Action", U.S. Appl. No. 13/570,073, dated Jan. 23, 2015, 7 pages.
"Non-Final Office Action", U.S. Appl. No. 13/631,308, dated Feb. 23, 2015, 9 pages.
"Non-Final Office Action", U.S. Appl. No. 13/774,875, dated Nov. 24, 2014, 8 pages.
"Non-Final Office Action", U.S. Appl. No. 14/134,993, dated Jan. 22, 2015, 17 pages.
"Non-Final Office Action", U.S. Appl. No. 14/134,993, dated Apr. 17, 2014, 34 pages.
"Notice of Allowance", U.S. Appl. No. 13/336,895, dated Aug. 11, 2014, 6 pages.
"Notice of Allowance", U.S. Appl. No. 13/343,675, dated Sep. 16, 2013, 8 pages.
"Notice of Allowance", U.S. Appl. No. 13/355,836, dated Jun. 13, 2014, 11 pages.
"Notice of Allowance", U.S. Appl. No. 13/355,836, dated Oct. 8, 2014, 11 pages.
"Notice of Allowance", U.S. Appl. No. 13/356,545, dated Mar. 28, 2014, 6 pages.
"Notice of Allowance", U.S. Appl. No. 13/488,145, dated Nov. 19, 2014, 8 pages.
"Restriction Requirement", U.S. Appl. No. 13/355,836, dated Sep. 27, 2013, 6 pages.
"Restriction Requirement", U.S. Appl. No. 13/397,539, dated Dec. 1, 2014, 6 pages.
"Restriction Requirement", U.S. Appl. No. 13/488,145, dated Sep. 8, 2014, 14 pages.
"Restriction Requirement", U.S. Appl. No. 13/570,073, dated Nov. 18, 2014, 7 pages.
"Supplemental Notice of Allowance", U.S. Appl. No. 13/356,545, dated Jul. 22, 2014, 2 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, dated Oct. 10, 2014, 6 Pages.
Allen, "ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>,Jun. 2007, pp. 155-159.
Baluja, et al., "'Sprinting' chips could push phones to the speed limit", New Scientist, Feb. 20, 2012, Issue #2852, Feb. 20, 2012, 2 pages.
Baluja, et al., "Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>,Jan. 5, 1994, 14 pages.
Barger, "COTS Cooling", Publication of the National Electronics Manufacturing Center of Excellence, Retrieved from: <http://www.empf.org/empfasis/2009/Oct09/cots.html > on Jul. 9, 2012,Oct. 2009, 4 pages.
Baudisch, et al., "Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.
Chen, et al., "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.
Cheng, et al., "Waveguide Displays Based on Polymer-dispersed Liquid Crystals", SPIE Newsroom, Available at <http://spie.org/documents/Newsroom/Imported/003805/003805_10.pdf>,Aug. 12, 2011, 2 pages.
Chirgwin, "Researchers propose 'overclock' scheme for mobiles—Processing at a sprint to overcome tech limitations", The Register, Feb. 21, 2012, Feb. 21, 2012, 2 pages.
Coldewey, "Researchers Propose "Computational Sprinting" to Speed Up Chips by 1000%—but Only for a Second", TechCrunch, Feb. 28, 2012, Feb. 29, 2012, 2 pages.

(56) References Cited

OTHER PUBLICATIONS

Deagazio, "Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012,Jan. 2, 2008, 4 pages.

Eadicicco, "First Transparent Tablet Lets You Touch From Both Sides", Retrieved from <http://blog.laptopmag.com/first-transparent-tablet>, Dec. 26, 2013, 4 pages.

Greenemeier, "Could "Computational Sprinting" Speed Up Smart Phones without Burning Them Out?", Scientific American, Feb. 29, 2012, Feb. 29, 2012, 2 pages.

Han, et al., "Accurate diffraction efficiency control for multiplexed volume holographic gratings", Retrieved at: opticalengineering.spiedigitallibrary.org/data/Journals/.../2799_1, 2002, 4 pages.

Hua, et al., "Engineering of Head-mounted Projective Displays", In Proceedings of Applied Optics, vol. 39, No. 22, Aug. 1, 2000, 11 pages.

Jacques, et al., "Polarized Light Imaging of Tissue", Available at <http://www.lumamed.com/documents/5_polarized%20light%20imaging.pdf>,2004, 17 pages.

Jarvenpaa, et al., "Compact near-to-eye display with integrated gaze tracker", Second International Conference on Computer Engineering and Applications, Mar. 19, 2010, 9 pages.

Jaworski, et al., "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.

Karp, et al., "Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>,Jan. 2009, 11 pages.

Kress, et al., "Exit Pupil for Wearable See-through displays", Downloaded From: http://proceedings.spiedigitallibrary.org/ on Jan. 31, 2015 Terms of Use: http://spiedl.org/terms, 2012, 8 pages.

Krishnan, et al., "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.

Lanman, et al., "Near-eye Light Field Displays", In Journal of ACM Transactions on Graphics, vol. 32, No. 6, Nov. 2013, 10 pages.

Large, et al., "Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>,Jun. 21, 2010, pp. 1-7.

Lerner, "Penn Helps Rethink Smartphone Design With 'Computational Sprinting'", Penn News Release, Feb. 28, 2012, 2 pages.

Li, et al., "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >,Aug. 2009, pp. 335-340.

Li, et al., "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.

Man, et al., "IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.

Massenot, et al., "Multiplexed holographic transmission gratings recorded in holographic polymer-dispersed liquid crystals: static and dynamic studies", Retrieved at: http://oatao.univ-toulouse.fr/2874/, 2005, 8 pages.

McMillan, "Your Future iPhone May Be Stuffed With Wax", Aug. 23, 2013, 3 pages.

Melcher, "LCoS for High Performance Displays", In Proceedings of LEOS 2003, Available at <http://ieeexplore.ieee.org/stamp/stamp.jsp?tp=&arnumber=1253048>,Oct. 27, 2003, pp. 812-813.

Minier, et al., "Diffraction Characteristics of Superimposed Holographic gratings in Planar Optical waveguides", IEEE Photonics Technology Letters, vol. 4, No. 10, Oct. 1992, 4 pages.

Moore, "Computational sprinting pushes smartphones till they're tired", Michigan News Release, Feb. 28, 2012, 2 pages.

Nguyen, et al., "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>,Mar. 2000, pp. 86-90.

Owano, "Study explores computing bursts for smartphones", PhysOrg.com, Feb. 21, 2012, Feb. 21, 2012, 2 pages.

Papaefthymiou, et al., "Computational Sprinting on a Hardware/Software Testbed", In the Proceedings of the 18th Eighteenth International Conference on Architectural Support for Programming Languages and Operating Systems (ASPLOS), Mar. 2013., Mar. 2013, 12 pages.

Patrizio, "Researchers Working on Ways to Put 16-Core Processors in Smartphones", Brighthand, Mar. 18, 2012, Mar. 18, 2012, 2 pages.

Pu, et al., "Exposure schedule for multiplexing holograms in photopolymer films", Retrieved at: lo.epach/webdav/site/lo/shared/1996/OE_35_2824_Oct1996.pdf, Oct. 1996, 6 pages.

Raghavan, et al., "Computational Sprinting", In the Proceedings of the 18th Symposium on High Performance Computer Architecture (HPCA), Feb. 2012, Feb. 2012, 12 pages.

Raghavan, et al., "Designing for Responsiveness With Computational Sprinting", IEEE Micro's "Top Picks of 2012" Issue, May 2013, 8 pages.

Scott, et al., "RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.

Singh et al., "Laser-Based Head-Tracked 3D Display Research", Journal of Display Technology, vol. 6, No. 10, Available at <http://ieeexplore.ieee.org/stamp/stamp.jsp?tp=&arnumber=5462999>,Oct. 2010, pp. 531-543.

Stupar, et al., "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.

Tari, et al., "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.

Travis, et al., "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.

Travis, et al., "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.

Van "A Survey of Augmented Reality Technologies, Applications and Limitations", The International Journal of Virtual Reality, 2010, 9(2), Available at <http://www.ijyr.org/issues/issue2-2010/paper%20.pdf>,Jun. 2010, pp. 1-19.

Walker, "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.

Wigdor, et al., "LucidTouch: A See-Through Mobile Device", In Proceedings of 20th Annual ACM symposium on User Interface

(56) References Cited

OTHER PUBLICATIONS

Software and Technology, Retrieved from <http://dl.acm.org/citation.cfm?id=1294259>,Oct. 7, 2007, 10 pages.
Yan, et al., "Multiplexing holograms in the photopolymer with equal diffraction efficiency", 2005, 9 pages.
Zharkova, et al., "Study of the Dynamics of Transmission Gratings Growth on Holographic Polymer-Dispersed Liquid Crystals", International Conference on Methods of Aerophysical Research, ICMAR 2008, 2008, 4 pages.
"International Search Report & Written Opinion for PCT Patent Application No. PCT/US2013/076832", dated Mar. 17, 2014, Filed Date: Dec. 20, 2013, 12 Pages.
"DigiLens", Retrieved at <<http://www.digilens.com/products.html>>, Retrieved Date: Jun. 19, 2012, p. 1.
"Light Guide Display and Field of View", U.S. Appl. No. 13/428,879, filed Mar. 23, 2012, pp. 56.
"Augmented Reality and Physical Games", U.S. Appl. No. 13/440,165, filed Apr. 5, 2012, pp. 49.
"Foreign Office Action", EP Application No. 13769961.7, dated Mar. 11, 2015, 8 pages.
"Non-Final Office Action", U.S. Appl. No. 13/336,873, dated Apr. 9, 2015, 18 pages.
"Non-Final Office Action", U.S. Appl. No. 13/397,495, dated Apr. 3, 2015, 11 pages.
"Supplementary European Search Report", EP Application No. 13769961.7, dated Mar. 3, 2015, 3 pages.
"Final Office Action", U.S. Appl. No. 13/397,539, dated Jun. 29, 2015, 11 pages.
"Final Office Action", U.S. Appl. No. 13/440,165, dated Jul. 21, 2015, 11 pages.
"Final Office Action", U.S. Appl. No. 13/774,875, dated Jun. 4, 2015, 10 pages.
"Final Office Action", U.S. Appl. No. 14/134,993, dated Jul. 16, 2015, 19 pages.
"Foreign Office Action", EP Application No. 13769961.7, dated Jun. 30, 2015, 6 pages.
"Non-Final Office Action", U.S. Appl. No. 13/397,617, dated May 5, 2015, 6 pages.
"Non-Final Office Action", U.S. Appl. No. 13/428,879, dated Jun. 26, 2015, 13 pages.
"Non-Final Office Action", U.S. Appl. No. 13/432,311, dated Jun. 2, 2015, 25 pages.
"Non-Final Office Action", U.S. Appl. No. 13/477,646, dated Jun. 18, 2015, 43 pages.
"Supplementary European Search Report", EP Application No. 13765041.2, dated Jul. 21, 2015, 3 pages.
"Corrected Notice of Allowance", U.S. Appl. No. 13/336,873, dated Sep. 11, 2015, 4 pages.
"Foreign Office Action", EP Application No. 13765041.2, dated Aug. 5, 2015, 6 pages.
"Non-Final Office Action", U.S. Appl. No. 13/397,516, dated Sep. 24, 2015, 14 pages.
"Non-Final Office Action", U.S. Appl. No. 13/397,539, dated Oct. 1, 2015, 12 pages.
"Non-Final Office Action", U.S. Appl. No. 13/774,875, dated Sep. 16, 2015, 8 pages.
"Notice of Allowance", U.S. Appl. No. 13/397,495, dated Oct. 20, 2015, 6 pages.
"Restriction Requirement", U.S. Appl. No. 13/420,388, dated Aug. 13, 2015, 6 pages.
"Corrected Notice of Allowance", U.S. Appl. No. 13/336,873, dated Nov. 27, 2015, 4 pages.
"Final Office Action", U.S. Appl. No. 13/397,617, dated Nov. 18, 2015, 11 pages.
"Final Office Action", U.S. Appl. No. 13/428,879, dated Dec. 10, 2015, 16 pages.
"Final Office Action", U.S. Appl. No. 13/477,646, dated Nov. 24, 2015, 39 pages.
"International Search Report and Written Opinion", Application No. PCT/US2015/041900, dated Oct. 21, 2015, 12 pages.
"International Search Report and Written Opinion", Application No. PCT/US2015/041909, dated Oct. 20, 2015, 13 pages.
"Non-Final Office Action", U.S. Appl. No. 13/420,388, dated Dec. 4, 2015, 7 pages.
"Notice of Allowance", U.S. Appl. No. 14/134,993, dated Nov. 17, 2015, 9 pages.
Ando,"Development of Three-Dimensional Microstages Using Inclined Deep-Reactive Ion Etching", Journal of Microelectromechanical Systems, Jun. 1, 2007, 10 pages.
Gila,"First Results From a Multi-Ion Beam Lithography and Processing System at the University of Florida", AIP Conference Proceedings, Jun. 1, 2011, 6 pages.
"Advisory Action", U.S. Appl. No. 13/432,311, dated Mar. 24, 2016, 3 pages.
"Corrected Notice of Allowance", U.S. Appl. No. 13/397,495, dated Mar. 3, 2016, 4 pages.
"Corrected Notice of Allowance", U.S. Appl. No. 13/397,516, dated Mar. 3, 2016, 2 pages.
"Final Office Action", U.S. Appl. No. 13/397,539, dated Apr. 21, 2016, 14 pages.
"Final Office Action", U.S. Appl. No. 13/420,388, dated Apr. 21, 2016, 9 pages.
"Final Office Action", U.S. Appl. No. 13/432,311, dated Dec. 18, 2015, 9 pages.
"International Search Report and Written Opinion", Application No. PCT/US2016/015496, dated Apr. 11, 2016, 11 pages.
"Non-Final Office Action", U.S. Appl. No. 13/440,165, dated Mar. 28, 2016, 13 pages.
"Notice of Allowance", U.S. Appl. No. 13/397,516, dated Feb. 1, 2016, 7 pages.
"Supplemental Notice of Allowance", U.S. Appl. No. 13/397,495, dated Jan. 26, 2016, 4 pages.
"Supplemental Notice of Allowance", U.S. Appl. No. 14/134,993, dated Mar. 2, 2016, 6 pages.
"Supplemental Notice of Allowance", U.S. Appl. No. 14/447,464, dated Jan. 12, 2016, 2 pages.
"Examiner's Answer to Appeal Brief", U.S. Appl. No. 13/428,879, dated Oct. 12, 2016, 18 pages.
"Examiner's Answer to Appeal Brief", U.S. Appl. No. 13/477,646, dated Oct. 26, 2016, 12 pages.
"Final Office Action", U.S. Appl. No. 13/397,617, dated Sep. 21, 2016, 10 pages.
"Foreign Office Action", CN Application No. 201380067523.1, dated Aug. 22, 2016, 13 pages.
"Non-Final Office Action", U.S. Appl. No. 13/440,165, dated Sep. 22, 2016, 13 pages.
"Non-Final Office Action", U.S. Appl. No. 14/617,606, dated Sep. 9, 2016, 12 pages.
"Notice of Allowance", U.S. Appl. No. 13/420,388, dated Oct. 6, 2016, 5 pages.
"Notice of Allowance", U.S. Appl. No. 14/635,474, dated Oct. 17, 2016, 10 pages.
"Notice of Allowance", U.S. Appl. No. 15/171,924, dated Oct. 21, 2016, 8 pages.
"Foreign Office Action", CN Application No. 201380015757.1, dated Jul. 11, 2016, 13 pages.
"Foreign Office Action", CN Application No. 201380017348.5, dated Jan. 14, 2016, 12 pages.
"Foreign Office Action", EP Application No. 13765041.2, dated Aug. 4, 2016, 5 pages.
"Non-Final Office Action", U.S. Appl. No. 13/397,539, dated Sep. 9, 2016, 16 pages.
"Non-Final Office Action", U.S. Appl. No. 13/432,311, dated Aug. 17, 2016, 18 pages.
"Corrected Notice of Allowance", U.S. Appl. No. 13/397,516, dated May 16, 2016, 2 pages.
"Final Office Action", U.S. Appl. No. 13/774,875, dated Apr. 22, 2016, 10 pages.
"Foreign Office Action", CN Application No. 201380017348.5, dated Jun. 17, 2016, 7 pages.
"International Search Report and Written Opinion", Application No. PCT/US2016/015873, dated May 23, 2016, 11 pages.

(56) References Cited

OTHER PUBLICATIONS

"Non-Final Office Action", U.S. Appl. No. 13/397,617, dated May 18, 2016, 8 pages.
"Non-Final Office Action", U.S. Appl. No. 14/617,606, dated May 23, 2016, 12 pages.
"Non-Final Office Action", U.S. Appl. No. 15/171,924, dated Jul. 13, 2016, 8 pages.
"Restriction Requirement", U.S. Appl. No. 14/635,474, dated Jul. 12, 2016, 5 pages.
"Corrected Notice of Allowance", U.S. Appl. No. 15/171,924, dated May 17, 2017, 2 pages.
"Ex Parte Quayle Action", U.S. Appl. No. 14/617,769, Jun. 2, 2017, 7 pages.
"Final Office Action", U.S. Appl. No. 13/432,311, dated May 15, 2017, 22 pages.
"Final Office Action", U.S. Appl. No. 13/432,372, dated Mar. 18, 2016, 36 pages.
"Final Office Action", U.S. Appl. No. 14/178,731, dated Aug. 12, 2015, 13 pages.
"Foreign Notice of Allowance", CN Application No. 201380067523.1, dated Jun. 2, 2017, 4 pages.
"Foreign Office Action", Application No. 13770174.4, dated Dec. 21, 2015, 6 pages.
"Foreign Office Action", AU Application No. 2013361148, dated Apr. 11, 2017, 3 pages.
"Foreign Office Action", CN Application No. 201380017346.6, dated Jan. 25, 2017, 7 pages.
"Foreign Office Action", CN Application No. 201380017346.6, dated Jan. 28, 2016, 12 pages.
"Foreign Office Action", CN Application No. 201380017346.6, dated Oct. 9, 2016, 7 pages.
"Foreign Office Action", CN Application No. 201380067523.1, dated Apr. 17, 2017, 6 pages.
"Foreign Office Action", EP Application No. 13770174.4, dated Mar. 11, 2015, 8 pages.
"Foreign Office Action", EP Application No. 13770174.4, dated Jul. 1, 2015, 6 pages.
"Foreign Office Action", JP Application No. 2015-503284, dated Dec. 22, 2016, 12 pages.
"International Preliminary Report on Patentability", Application No. PCT/US2016/015871, dated May 15, 2017, 10 pages.
"International Preliminary Report on Patentability", Application No. PCT/US2016/015873, dated May 15, 2017, 8 pages.
"International Preliminary Report on Patentability", Application No. PCT/US2016/015496, dated May 4, 2017, 9 pages.
"International Search Report and Written Opinion", Application No. PCT/US2015/014699, dated May 4, 2015, 16 Pages.
"Non-Final Office Action", U.S. Appl. No. 13/432,372, dated Jul. 1, 2016, 11 pages.
"Non-Final Office Action", U.S. Appl. No. 13/432,372, dated Aug. 27, 2015, 35 pages.
"Non-Final Office Action", U.S. Appl. No. 14/178,731, dated Apr. 17, 2015, 10 pages.
"Notice of Allowance", U.S. Appl. No. 13/432,372, dated Sep. 14, 2016, 10 pages.
"Supplemental Notice of Allowance", U.S. Appl. No. 13/432,372, dated Oct. 6, 2016, 4 pages.
"Supplemental Notice of Allowance", U.S. Appl. No. 13/432,372, dated Dec. 30, 2016, 4 pages.
"Supplementary European Search Report", EP Application No. 13770174.4, dated Mar. 3, 2015, 3 pages.
Travis,"Wedge Optics in Flat Panel Displays", Retrieved from: http://download.microsoft.com/download/4/B/4/4B49C102-407A-4CEA-ADB5-EF4E4E7F5F63/Wedge%20optics%20in%20flat%20panel%20displays.pdf, Jul. 14, 2011, 15 Pages.
"Corrected Notice of Allowance", U.S. Appl. No. 13/397,539, dated Apr. 12, 2017, 2 pages.
"Corrected Notice of Allowance", U.S. Appl. No. 13/397,539, dated Apr. 24, 2017, 2 pages.
"Corrected Notice of Allowance", U.S. Appl. No. 15/171,924, dated Mar. 31, 2017, 2 pages.
"Corrected Notice of Allowance", U.S. Appl. No. 15/171,924, dated Nov. 30, 2016, 2 pages.
"Final Office Action", U.S. Appl. No. 14/617,606, dated Dec. 27, 2016, 13 pages.
"Foreign Notice of Allowance", TW Application No. 102101510, dated Mar. 23, 2017, 4 pages.
"Foreign Office Action", AU Application No. 2013361148, dated Feb. 15, 2017, 3 pages.
"Foreign Office Action", CN Application No. 201380015757.1, dated Mar. 27, 2017, 12 pages.
"Foreign Office Action", CN Application No. 201380017348.5, dated Oct. 18, 2016, 7 pages.
"Foreign Office Action", JP Application No. 2015-501688, dated Dec. 20, 2016, 8 pages.
"Foreign Office Action", TW Application No. 102101510, dated Dec. 6, 2016, 11 pages.
"International Preliminary Report on Patentability", Application No. PCT/US2015/041900, dated Oct. 11, 2016, 6 pages.
"Non-Final Office Action", U.S. Appl. No. 13/397,617, dated Jan. 12, 2017, 10 pages.
"Non-Final Office Action", U.S. Appl. No. 14/617,606, dated Mar. 27, 2017, 14 pages.
"Non-Final Office Action", U.S. Appl. No. 14/617,769, dated Jan. 12, 2017, 10 pages.
"Notice of Allowance", U.S. Appl. No. 13/397,539, dated Mar. 22, 2017, 7 pages.
"Notice of Allowance", U.S. Appl. No. 13/397,617, dated Apr. 25, 2017, 5 pages.
"Notice of Allowance", U.S. Appl. No. 13/440,165, dated Mar. 23, 2017, 5 pages.
"Notice of Allowance", U.S. Appl. No. 15/171,924, dated Feb. 1, 2017, 8 pages.
"Second Written Opinion", Application No. PCT/US2016/015496, dated Feb. 9, 2017, 7 pages.
"Second Written Opinion", Application No. PCT/US2016/015869, dated Jan. 20, 2017, 5 pages.
"Second Written Opinion", Application No. PCT/US2016/015873, dated Feb. 6, 2017, 6 pages.
"Supplemental Notice of Allowance", U.S. Appl. No. 14/635,474, dated Feb. 2, 2017, 4 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
"Foreign Office Action", CN Application No. 201380015757.1, dated Dec. 19, 2017, 10 pages.
"Foreign Office Action", JP Application No. 2015-501688, dated Dec. 5, 2017, 7 pages.
"Foreign Office Action", JP Application No. 2015-549765, dated Nov. 1, 2017, 7 pages.
"Foreign Office Action", RU Application No. 2015124081, dated Nov. 14, 2017, 10 pages.
"Notice of Allowance", U.S. Appl. No. 14/617,769, dated Nov. 17, 2017, 9 pages.
"Final Office Action", U.S. Appl. No. 14/617,606, dated Sep. 5, 2017, 15 pages.
"Foreign Office Action", JP Application No. 2015-503284, dated Aug. 16, 2017, 12 pages.
"Non-Final Office Action", U.S. Appl. No. 13/432,311, dated Sep. 20, 2017, 27 pages.
"Non-Final Office Action", U.S. Appl. No. 15/642,020, dated Oct. 6, 2017, 14 pages.
"Advisory Action", U.S. Appl. No. 13/432,311, dated Jul. 14, 2017, 3 pages.
"Corrected Notice of Allowance", U.S. Appl. No. 13/397,539, dated Jun. 29, 2017, 2 pages.
"Corrected Notice of Allowance", U.S. Appl. No. 13/397,617, dated Aug. 15, 2017, 2 pages.
"Corrected Notice of Allowance", U.S. Appl. No. 13/397,617, dated Jul. 26, 2017, 3 pages.
"Foreign Notice of Allowance", AU Application No. 2013361148, dated Jul. 17, 2017, 3 pages.

(56) References Cited

OTHER PUBLICATIONS

"Foreign Office Action", JP Application No. 2015-501688, dated Jul. 4, 2017, 6 pages.
"Non-Final Office Action", U.S. Appl. No. 14/447,446, dated Jun. 9, 2017, 15 pages.
"Notice of Allowance", U.S. Appl. No. 15/432,756, dated Jun. 23, 2017, 8 pages.
Office Action Issued in Mexico Patent Application No. MX/a/2015/008123, dated Apr. 10, 2018, pp. 4.
"Office Action Issued in Japanese Patent Application No. 2015-549765", dated Jul. 2, 2018, 9 Pages.

\* cited by examiner

AUTO-STEREOSCOPIC AUGMENTED REALITY DISPLAY

BACKGROUND

Various types of computing, entertainment, and/or mobile devices, such as tablets and mobile phones, can be implemented with a transparent or semi-transparent display through which a user of a device can view the surrounding environment. Further, augmented reality provides that a user can see through the transparent or semi-transparent display of a device to view the surrounding environment, and also see images of virtual objects that are generated for display to appear as a part of the environment. Augmented reality can include any type of input such as audio and haptic inputs, as well as virtual images, graphics, and video that enhances or augments the environment that a user experiences. As an emerging technology, there are challenges and design constraints with augmented reality, particularly with displaying the virtual objects and images on the display of a mobile device so that they appear realistic in the real environment.

Stereopsis is the perception of depth when a person views the environment with normal binocular vision. A person typically sees a slightly different image of the environment with each eye because angles from objects in the environment to the person's left and right eyes will be different, and the differences provide the cues to determine depth perception. This may also be referred to as a parallax, which is the angle difference in the apparent position of an object as viewed along two different lines of sight, such as from the person's left eye and from the right eye when viewing the object in the environment. For a far field object, there is typically zero parallax between a device display, as seen by the left and right eyes, and the far field object. However, when objects are closer, there is a parallax between the left and the right eyes.

Waveguide displays can be utilized for see-through augmented reality display devices, such in head-mounted display (HMD) glasses or other wearable display devices that have near-eye display panels as lenses to display a virtual image in an augmented reality environment. In a head-mounted display device, the separate display panels for the left and right eyes can be independently adjusted to provide correct stereopsis cues when viewing a near-field virtual object. However, stereopsis correction is not available for a mobile, handheld device with a single integrated waveguide display without the use of eye wear, such as LCD shutter glasses or polarized glasses. Having to utilize eye wear for corrected binocular vision when using a mobile, handheld device with an augmented reality display does not provide a viable user experience.

SUMMARY

This Summary introduces features and concepts of an auto-stereoscopic augmented reality display, which is further described below in the Detailed Description and/or shown in the Figures. This Summary should not be considered to describe essential features of the claimed subject matter, nor used to determine or limit the scope of the claimed subject matter.

An auto-stereoscopic augmented reality display is described. In embodiments, the display device is implemented with an imaging structure that includes a waveguide for see-through viewing of an environment. The waveguide also transmits light of a virtual image that is generated as a near-display object to appear at a distance in the environment. The imaging structure includes switchable diffractive elements that are integrated in the waveguide and configured in display zones. The switchable diffractive elements are switchable to independently activate the display zones effective to correct for an accurate stereopsis view of the virtual image that appears at the distance in the environment.

In embodiments, a computing device, such as a mobile phone or tablet device, is implemented with the auto-stereoscopic augmented reality display, and the computing device includes an imaging controller to independently control activation of the switchable diffractive elements in the display zones of the display device. The switchable diffractive elements that are integrated in the waveguide of the display device can be implemented as Switchable Bragg Gratings that can be switched-on to project the virtual image for display. For example, a representation of the virtual image can be displayed in a first display zone for user viewing with a right eye, and a different representation of the virtual image can be displayed in a second display zone for user viewing with a left eye. The computing device also includes an element drive circuit to selectively activate the switchable diffractive elements in the display zones of the display device based on imaging controller inputs.

In embodiments, the switchable diffractive elements can be configured in sets of stacked elements that are integrated in the display device. Each switchable diffractive element in a set of stacked elements diffracts light of the virtual image in a different field of view, and the different fields of view combine for a sequential field of view that spans an activated display zone. The computing device also includes a camera to capture digital images of the left and right eyes of the user of the computing device, and an eye-tracking system tracks the pupil positions of the left and right eyes based on the digital images. The eye-tracking system can also determine a distance from the left and right eyes to the display device, and determine viewing angles of the left and right eyes to a center of the display device. The imaging controller is implemented to control the activation of the switchable diffractive elements in a display zone based on the pupil positions of the left and right eyes, the distance from the left and right eyes to the display device, and the viewing angles of the left and right eyes to the center of the display device.

BRIEF DESCRIPTION OF THE DRAWINGS

Embodiments of an auto-stereoscopic augmented reality display are described with reference to the following Figures. The same numbers may be used throughout to reference like features and components that are shown in the Figures.

DETAILED DESCRIPTION

Embodiments of an auto-stereoscopic augmented reality display are described. The display device can be implemented with a see-through waveguide that includes integrated switchable diffractive elements, such as Switchable Bragg Gratings (SBGs). The display device can be implemented in a mobile phone, tablet, or other type of computing device, and provides a true auto-stereoscopic display presentation of a virtual image that is generated as a near-display object to appear at a distance in an augmented reality environment. An accurate stereopsis view of the virtual image is provided to the left and right eyes of a user of the device for stereovision without the need of additional eye wear. The virtual image that is projected to the left and right eyes of the user are different, as displayed in independently controlled display zones of the display device. Separate displays for the left and right eyes are generated from a single, handheld device display.

Although generally described with reference to handheld, mobile devices, embodiments of an auto-stereoscopic augmented reality display may be implemented for larger format displays, such as vehicle head-up displays or even for larger architectural displays, as well as for non-see-through displays of any size and/or configuration for an accurate stereopsis view of a virtual image that is displayed for viewing.

While features and concepts of an auto-stereoscopic augmented reality display can be implemented in any number of different devices, systems, environments, and/or configurations, embodiments of an auto-stereoscopic augmented reality display is described in the context of the following example devices, systems, and methods.

Figure 1:
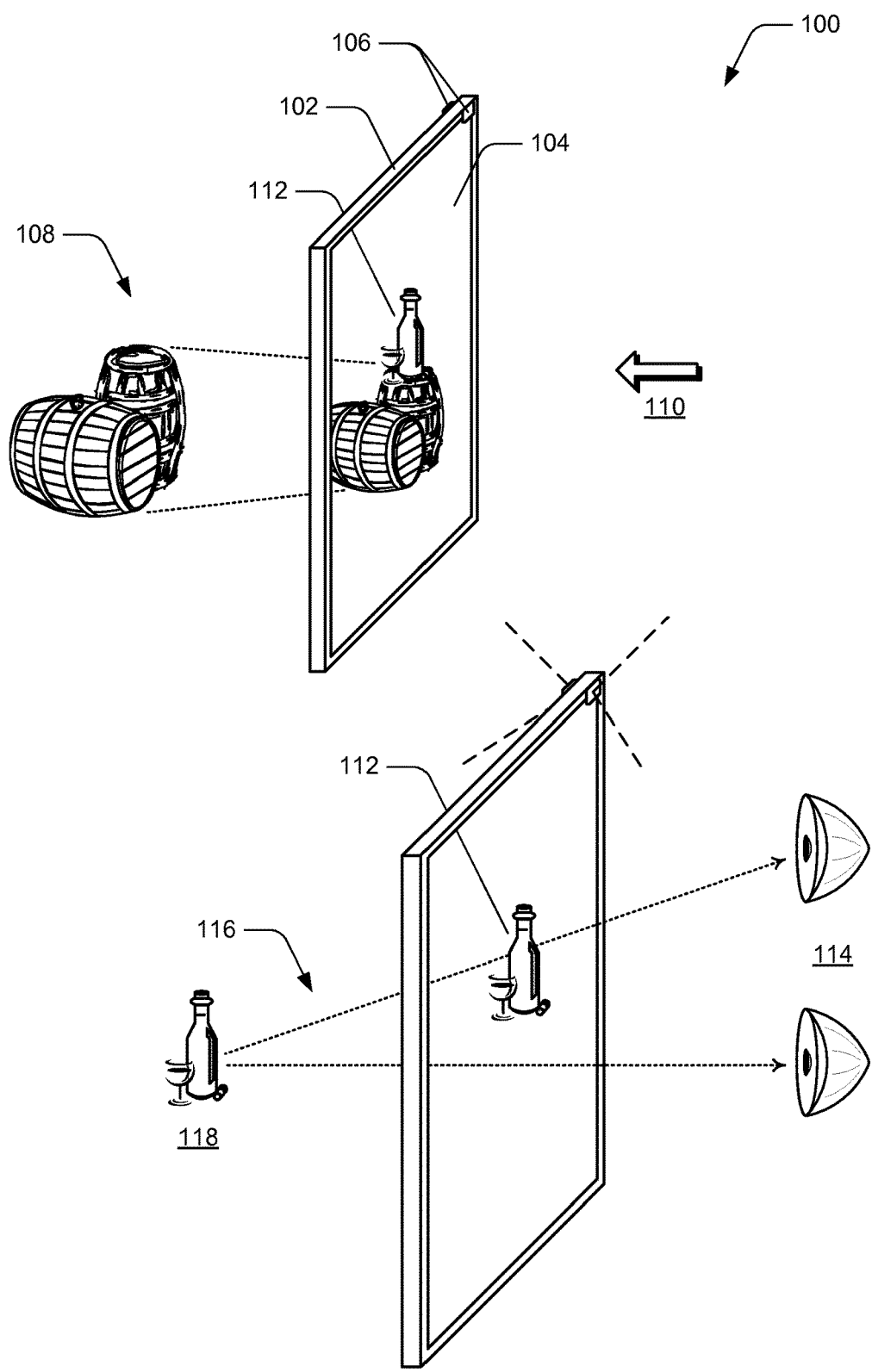
FIG. 1 illustrates an example computing device that implements an auto-stereoscopic augmented reality display in accordance with one or more embodiments.

FIG. 1 illustrates an example 100 of a computing device 102 that implements embodiments of an auto-stereoscopic augmented reality display, referred to as the display device 104. The example computing device may be any one or combination of a wired or wireless device, such as a mobile phone, tablet, computing, communication, entertainment, gaming, media playback, and/or other type of device. Any of the devices can be implemented with various components, such as a processing system and memory, front and back integrated digital cameras 106 to capture digital images, and any number and combination of differing components as further described with reference to the example devices shown in FIGS. 3 and 6.

In this example, the display device 104 is transparent, or semi-transparent, as perceived by a user when viewing an environment 108 through the display device from a viewing perspective 110. A virtual image 112 can be generated by the computing device 102 as a near-display object that is displayed by the display device 104 to appear at a distance in the environment for an augmented view of reality. For example, the virtual image of a wine bottle and glass can be generated to appear as if placed on a wine barrel that is physically part of the environment.

For near-display objects, such as the virtual image 112 that is projected to appear as part of the environment 108, the viewing angles 116 to the left and right eyes 114 of a user of the computing device 102 will be different. As described above, parallax is the angle difference in the apparent position of the virtual image as viewed along the two different lines of sight, such as from a person's left eye and right eye when viewing the virtual image in the environment. However, the stereopsis perception of depth is not determinable by the user because the virtual image is actually a near-display object that is displayed on the display device 104, which is closer to the left and right eyes 114 of the user than if the virtual image was actually physically part of the environment at the projected location 118.

As described with reference to FIG. 2, the display device 104 can be implemented with an imaging structure for an augmented reality display that is auto-stereoscopic, and the virtual image 112 can be generated for an accurate stereopsis view of the virtual image provided to the left and right eyes 114 of the user for stereovision without the need of additional eye wear. Additionally, the computing device 102 includes the integrated digital cameras 106, which can be utilized to capture digital images of the environment 108, and of the left and right eyes 114. The digital images of the environment can be utilized to determine a correct relationship of virtual images and other near-display objects in the environment. The digital images of the left and right eyes of the user can be utilized to track the positions of the eyes for correlation with the display position of near-display objects, such as the virtual image 112.

Figure 2:
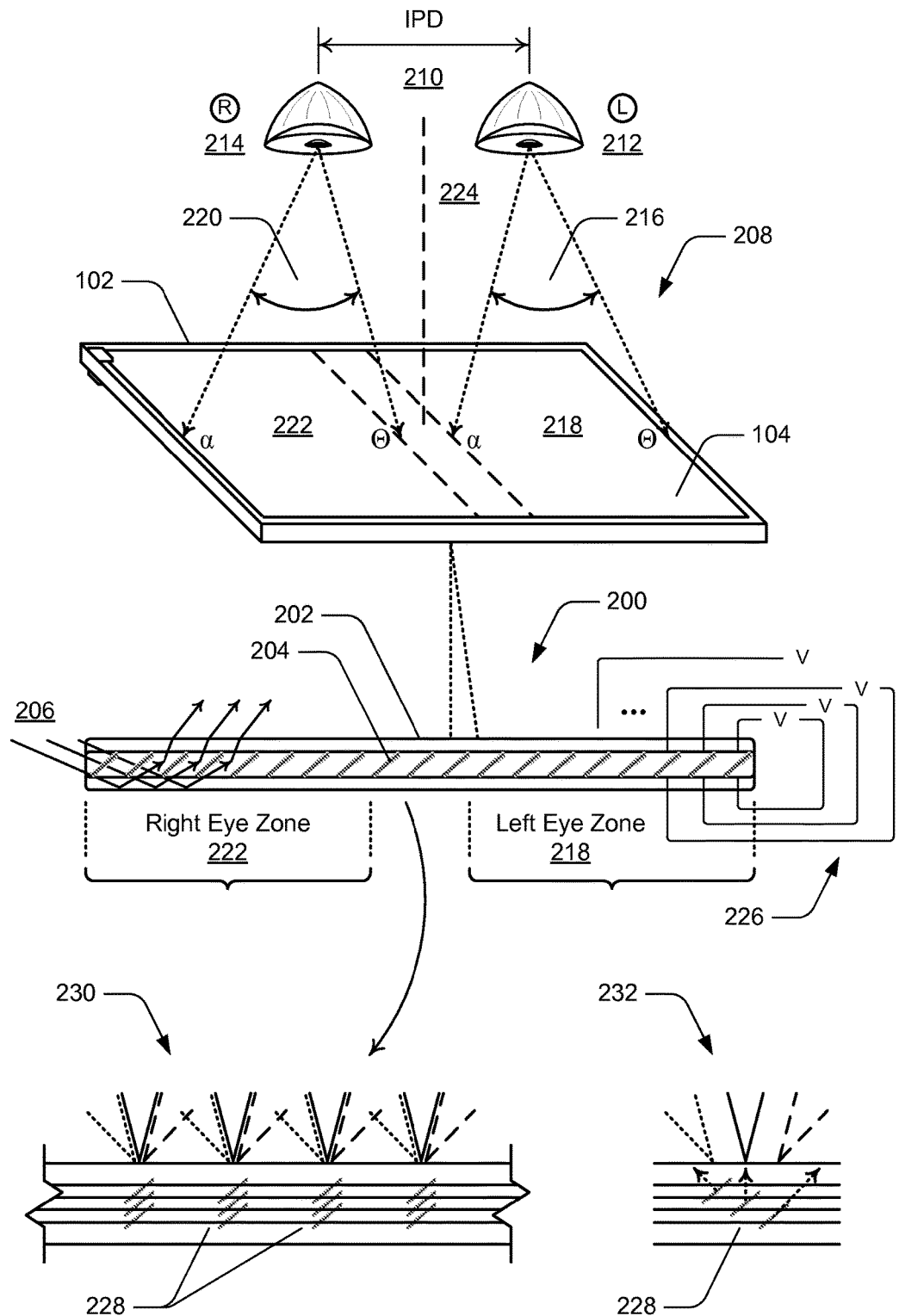
FIG. 2 illustrates an example imaging structure of an auto-stereoscopic augmented reality display in accordance with one or more embodiments.

FIG. 2 illustrates an example imaging structure 200 that can be utilized to implement an auto-stereoscopic augmented reality display, such as the display device 104 described with reference to FIG. 1 in accordance with embodiments described herein. The example imaging structure 200 is implemented with a see-through, reflecting waveguide 202 that includes switchable diffractive elements 204, such as may be implemented with Switchable Bragg Gratings (SBGs). Switchable Bragg Gratings are manufactured by SBG Labs and are described as having sub-millisecond switching speeds providing a high diffraction efficiency when activated, as well as optical transparency when inactive. The SBGs utilize Holographic Polymer-Dispersed Liquid Crystals and when switched-off, the refractive index of the liquid crystal approximately matches that of the surrounding polymer of the waveguide so that the SBG is essentially transparent to the display light. When an SBG is switched-on, the liquid crystal has a different refractive index than the polymer of the waveguide, and the light of a virtual image is diffracted to display on the display device.

The see-through, reflecting waveguide 202 is a display optic implemented for internal reflection of visible light 206 of the virtual image 112 that is generated by an imaging unit of the computing device 102 and projected for viewing by a user (as described with reference to FIG. 1). The waveguide also passes through light from the surrounding environment for viewing by the user. As shown at 208, if the display device 104 is wider than the interpupillary distance (IPD) 210 between the pupils of the left eye 212 and the right eye 214, then the field of view 216 from $\alpha°$ to $\theta°$ in a display zone 218 for the left eye is the same as the field of view 220 from $\alpha°$ to $\theta°$ in a display zone 222 for the right eye. This is commonly referred to as binocular overlap, and this increases with display size and with decreasing viewing distance (i.e., the closer the display is to the user). A ray-trace, perpendicular bisector 224 between the left and right eyes is also shown, and the perpendicular bisector establishes the left area of the display that is viewed by the left eye 212, which includes the display zone 218, and establishes the right area of the display that is viewed by the right eye 214, which includes the display zone 222.

A switchable diffractive element 204 (e.g., an SBG) that is integrated in the waveguide 202 can be switched-on by applying a potential between the element layers, and switched-off by removing the potential. The imaging structure 200 can include an element drive circuit 226 (only partially shown) that is controllable to selectively activate the switchable diffractive elements 204. The element drive circuit 226 can be implemented to control individual switchable diffractive elements and/or groups of the switchable diffractive elements as display zones of the display device 104. The conductive layers of the imaging structure 200 can be partitioned into sections that are selectively activated to control the switchable diffractive elements in the display zones, such as the left eye display zone 218 and the right eye display zone 222.

In embodiments, the switchable diffractive elements 204 that are integrated in the waveguide 202 of the imaging structure 200 can be configured in sets of stacked elements 228, as illustrated in the example at 230 of multiple, overlapping SBGs. Each of the switchable diffractive elements 204 in a set of stacked elements 228 diffracts the light of a virtual image in a different field of view, as further illustrated at 232. The different fields of view projected by each of the switchable diffractive elements in a set of stacked elements can combine for an overall sequential field of view that spans an activated display zone of the display device 104. In implementations that include the SBGs as the switchable diffractive elements 204 of the imaging structure 200, each SBG projects a small field of view synchronized with the display device, and a sequential field of view is generated by consecutively switching-on each SBG (e.g., in the sets of stacked elements). The switchable diffractive elements 204 are switched faster than a person can detect, and the fields of view will be perceived as one contiguous display, rather than as separate displays.

Figure 3:
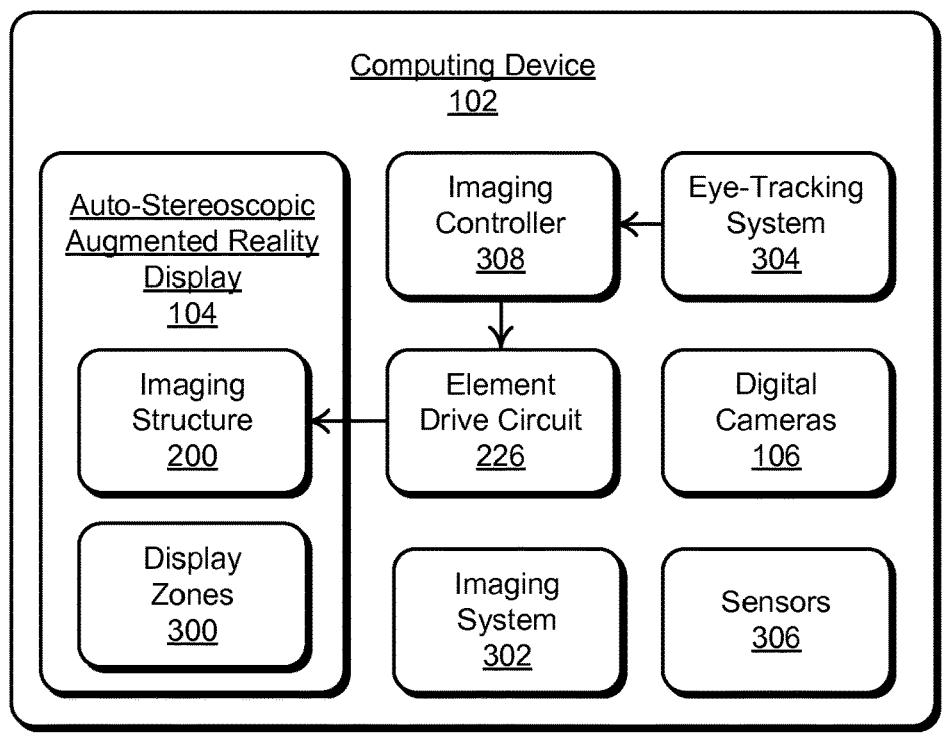
FIG. 3 illustrates an example computing device that implements embodiments of an auto-stereoscopic augmented reality display.

FIG. 3 illustrates an example of the computing device 102 that is shown and described with reference to FIGS. 1 and 2. The computing device includes the auto-stereoscopic augmented reality display (e.g., display device 104) that is implemented with the imaging structure 200, as described with reference to FIG. 2. The display device 104 can be distributed into display zones 300 based on the configuration of the switchable diffractive elements 204 that are integrated in the waveguide 202 of the imaging structure. The display zones of the display device are independently controllable effective to correct for an accurate stereopsis view of the virtual image 112 that appears at the distance in the environment 108, as shown in FIG. 1. The imaging structure of the display device can be controlled to display a representation of the virtual image in a first display zone for user viewing with a right eye, and display a different representation of the virtual image in a second display zone for user viewing with a left eye.

The computing device 102 includes an imaging system 302 that generates the virtual image 112 for display on the display device 104 as a near-display object that appears at a distance in the environment 108, which is viewable through the display device. The imaging system 302 can be implemented with any type of optics, lenses, micro display panels, and/or reflecting elements to display and project the light 206 of the virtual image 112 into the see-through and reflecting waveguide 202 of the imaging structure 200 for the display device.

The computing device 102 also includes the digital cameras 106 to capture digital images of the left and right eyes of a user of the device. As shown and described with reference to FIG. 1, the computing device 102 may include both front and back integrated digital cameras 106, which can be utilized to capture the digital images (e.g., video and/or still images) of the environment 108, and the digital images of the left and right eyes 114 of a user of the device.

The computing device 102 implements an eye-tracking system 304 to track pupil positions of the left and right eyes 114 of the user based on the digital images. The eye-tracking system is also implemented to determine a distance from the left and right eyes to the display device 104, and determine viewing angles of the left and right eyes to a center of the display device. The eye-tracking system can determine the position of the left and right eyes relative to the display device, to include whether the left and right eyes are on different viewing planes relative to the display device, and the display zones can then be switched-on and/or switched-off based on the relative eye position. An example of display zone switching is further described with reference to FIG. 4.

The computing device 102 may also include various sensors 306 that provide additional reference data (e.g., in addition to digital images captured with the digital cameras) to enable registration of the display device 104 with real objects in the environment. The sensors can include components for inertial based tracking and/or positioning system components, such as a GPS receiver and magnetic sensors (e.g., a compass). The various sensors may also include any one or combination of a temperature sensor, as well as inertial sensors and/or attitude sensors, including MEMS gyros and acceleration sensors for sensing position, orientation, and acceleration of the computing device. Additionally, the sensors can include a microphone to record audio data from the surrounding environment, as well as an output for audio feedback as part of an augmented reality experience.

The computing device 102 has an imaging controller 308 that can be implemented as a software application and maintained at the computing device 102 as executable instructions that are stored on computer-readable storage media, such as any suitable memory device or electronic data storage. Additionally, the imaging controller can be executed with a processing system of the computing device to implement embodiments of the auto-stereoscopic augmented reality display. Further, the computing device can be implemented with various components, such as a processing system and memory, as well as any number and combination of differing components as further described with reference to the example device shown in FIG. 6.

The imaging controller 308 also controls the element drive circuit 226, which selectively activates the switchable diffractive elements 204 in the respective display zones 300 of the display device 104 based on imaging controller inputs. The display zones can be switched-on and switched-off in alternate frames based on the left and right eye positions and movement as determined by the eye-tracking system 304. In implementations, activation of the switchable diffractive elements in respective display zones of the display device are controlled (e.g., switched-on and switched-off) based on the pupil positions of the left and right eyes, the distance from the left and right eyes to the display device, and the viewing angles of the left and right eyes to the center of the display device.

The imaging controller 308 is implemented to determine the left and right eye display zones 300 of the display device 104 dynamically as the eye-tracking system 304 determines the left and right eye positions and movement relative to the display device. The display zones are actively switched so as not to project at the same time, and the alternating display zones that are projected to the left and right eyes include the appropriate vector adjustments to facilitate a near-display object (e.g., the virtual image 112) being placed relative to the correct viewing angles of the object in the environment.

The imaging controller 308 can determine the ray-trace, perpendicular bisector 224 (also referred to as the cyclopean eye position) between the left and right eyes of a user for each projected field of view from the switchable diffractive elements 204 in the imaging structure 200, such as shown and described with reference to FIG. 2. Because the display device 104 is tiled as implemented with the switchable diffractive elements, each tile represents a new field of view, and the display zones for the left and right eyes are determined by calculating the ray-trace bisector 224 for each tile relative to the current bisector eye position. For example, if the switchable diffractive elements 204 have a 10° field of view, the ray-trace bisector between −5° to +5° for each switchable diffractive element is 0°, and this is plotted from the cyclopean eye position between the left and right eyes to a display zone of the display device. For the determined field of view of each switchable diffractive element, display zone segments to the left can be switched for the left eye, and display zone segments to the right can be switched for the right eye.

Similarly, the display zones 300 for the left and right eyes can be determined based on other fields of view of the switchable diffractive elements. For example, the left and right display zone segments for −15° to −5° are centered on a ray-trace bisector at −10°, which is plotted from the cyclopean eye position between the left and right eyes to a display zone of the display device. The display zone segments can shift left and/or right dependent on the ray-traced bisector from the cyclopean eye position. These display zone segments can shift sideways dependent on the left and right eye positions and movement as determined by the eye-tracking system 304. In implementations, the size of a display zone segment can be changed depending on the viewing distance. For a farther viewing distance, there is more likelihood that projected light from the imaging structure of the display device will cross over from the right eye to the left eye, and particularly for fast eye movement of the user. Additionally, if fast left and right eye movement is detected, the display zone segments can be set wider so that there is less chance of a loss of field of view.

Figure 4:
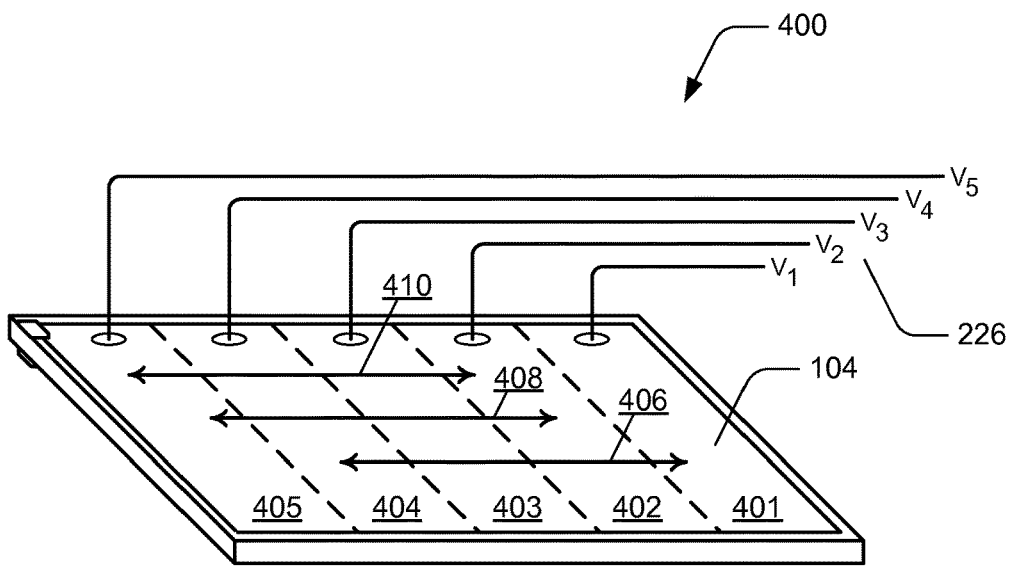
FIG. 4 illustrates an example implementation of an auto-stereoscopic augmented reality display in accordance with one or more embodiments.

FIG. 4 illustrates an example implementation 400 of an auto-stereoscopic augmented reality display, such as the display device 104 that is described with reference to FIGS. 1-3. In this example, the display device 104 is distributed into five display zones 401 through 405 that are actively controlled by respective potentials V1 through V5 of the element drive circuit 226, as described with reference to FIG. 2. When the eye-tracking system 304 of the computing device 102 determines that the eyes of a user are positioned at location 406, the switchable diffractive elements 204 of the display zones 401, 402, and 404 are switched-on, and the display zones 403 and 405 are switched-off. Both of the display zones 401 and 402 are switched-on for the left eye due to the position proximate both of the display zones. Accordingly, only about sixty-percent (60%) of the display device is illuminated, saving approximately forty-percent (40%) of the power that would otherwise be utilized to illuminate the entire display.

Similarly, when the eye-tracking system 304 determines that the eyes of the user are positioned at location 408, the switchable diffractive elements 204 of the display zones 402, 404, and 405 are switched-on, and the display zones 401 and 403 are switched-off. Both of the display zones 404 and 405 are switched-on for the right eye due to the position proximate both of the display zones. Additionally, when the eye-tracking system 304 determines that the eyes of the user are positioned at location 410, the switchable diffractive elements 204 of the display zones 402, 403, and 405 are switched-on, and the display zones 401 and 404 are switched-off. Both of the display zones 402 and 403 are switched-on for the left eye due to the position proximate both of the display zones.

Example method 500 is described with reference to FIG. 5 in accordance with one or more embodiments of an auto-stereoscopic augmented reality display. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 5:
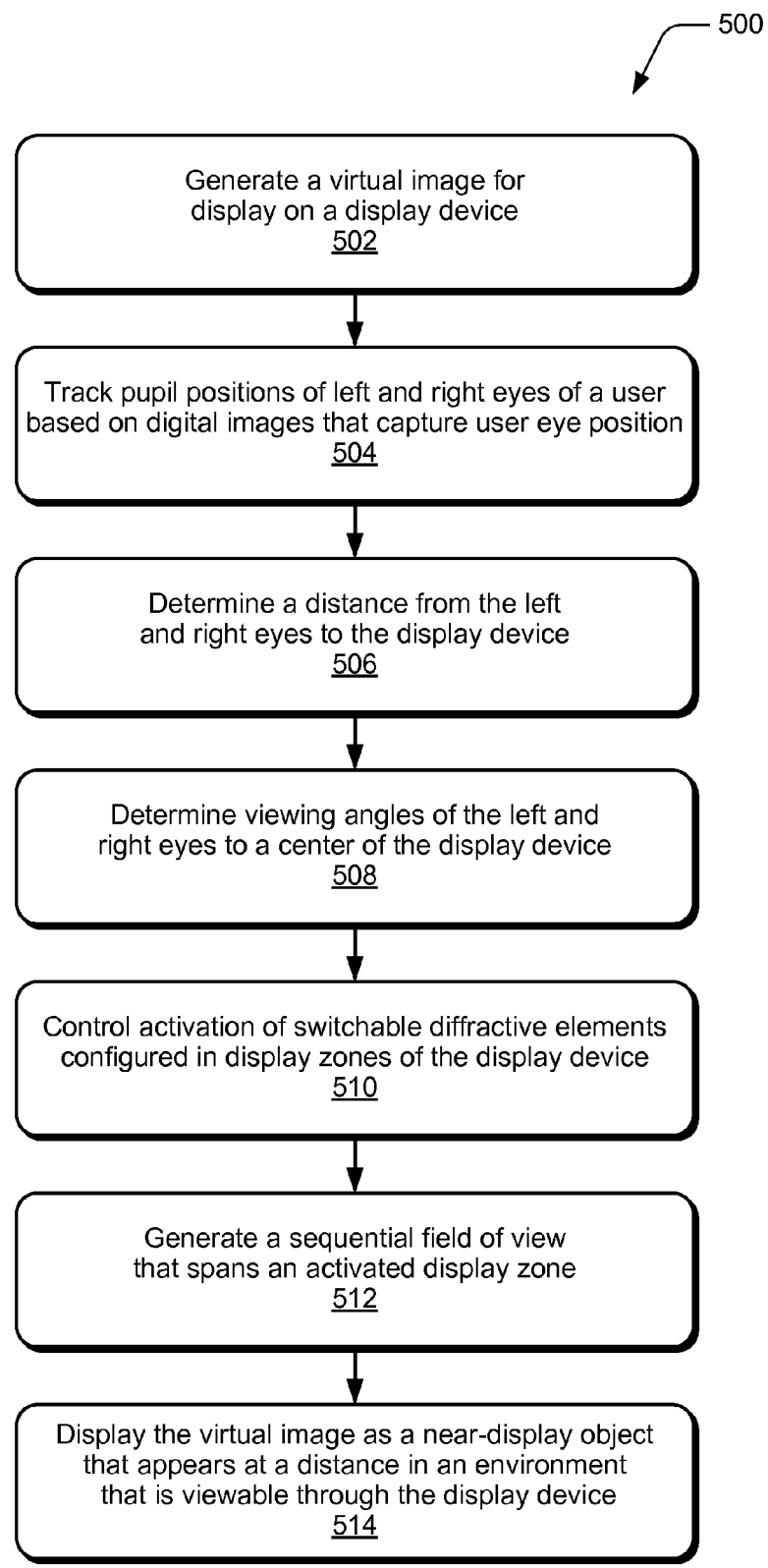
FIG. 5 illustrates example method(s) of an auto-stereoscopic augmented reality display in accordance with one or more embodiments.

FIG. 5 illustrates example method(s) 500 of an auto-stereoscopic augmented reality display. The order in which the method is described is not intended to be construed as a limitation, and any number or combination of the method operations can be combined in any order to implement a method, or an alternate method.

At 502, a virtual image is generated for display on a display device. For example, the imaging system 302 implemented at the computing device 102 (FIG. 3) generates the virtual image 112 for display, such as on the auto-stereoscopic augmented reality display (e.g., display device 104) implemented at the computing device 102 (FIG. 1). The virtual image is generated as a near-display object that appears at a distance in the environment 108 that is viewable through the display device for augmented reality imaging.

At 504, the pupil positions of left and right eyes of a user is tracked based on digital images that capture user eye position. For example, a digital camera 106 integrated with the computing device 102 captures digital images of left and right eyes 114 of a user of the computing device, and the eye-tracking system 304 tracks the pupil positions of the left and right eyes based on the digital images.

At 506, a distance from the left and right eyes to the display device is determined. For example, the eye-tracking system 304 at the computing device 102 determines a distance from the left and right eyes 114 of a user of the computing device to the display device 104 based on the digital images captured by the digital camera 106. At 508, viewing angles of the left and right eyes to a center of the display device are determined. For example, the eye-tracking system 304 at the computing device 102 also determines viewing angles 116 of the left and right eyes 114 of the user to the center of the display device 104 based on the digital images captured by the digital camera.

At 510, activation of switchable diffractive elements configured in display zones of the display device are controlled. For example, the imaging controller 308 at the computing device 102 controls activation of the switchable diffractive elements 204 that are configured in the display zones 300 of the display device 104. The display zones of the display device are independently controllable effective to correct for an accurate stereopsis view of the virtual image 112 that appears at the distance in the environment 108. The switchable diffractive elements in the display zones of the display device are selectively activated based on imaging controller inputs from the imaging controller 308 to project the virtual image for display. Further, activation of the switchable diffractive elements in a display zone is controlled based on the pupil position of the left and right eyes 114 (determined at 504); the distance from the left and right eyes to the display device (determined at 506); and the viewing angles 116 of the left and right eyes to the center of the display device (determined at 508).

At 512, a sequential field of view is generated that spans an activated display zone. For example, the imaging controller 308 at the computing device 102 controls the element drive circuit 226 to selectively activate the switchable diffractive elements 204 in the sets of stacked elements 228, where each switchable diffractive element in a set of stacked elements diffracts the light of the virtual image 112 in a different field of view (as shown at 230 and 232 in FIG. 2). The different fields of view projected by each of the switchable diffractive elements in the sets of stacked elements combine to generate the sequential field of view that spans an activated display zone of the display device.

At 514, the virtual image is displayed as a near-display object that appears at a distance in an environment that is viewable through the display device. For example, the auto-stereoscopic augmented reality display (e.g., the display device 104) implemented at the display device 102 displays the virtual image 112 over the sequential field of view as the near-display object that appears at a distance in the environment 108 that is viewable through the display device. A representation of the virtual image 112 can be displayed in the right eye display zone 222 for user viewing with the right eye 214, and a different representation of the virtual image can be displayed in the left eye display zone 218 for user viewing with the left eye 212.

Figure 6:
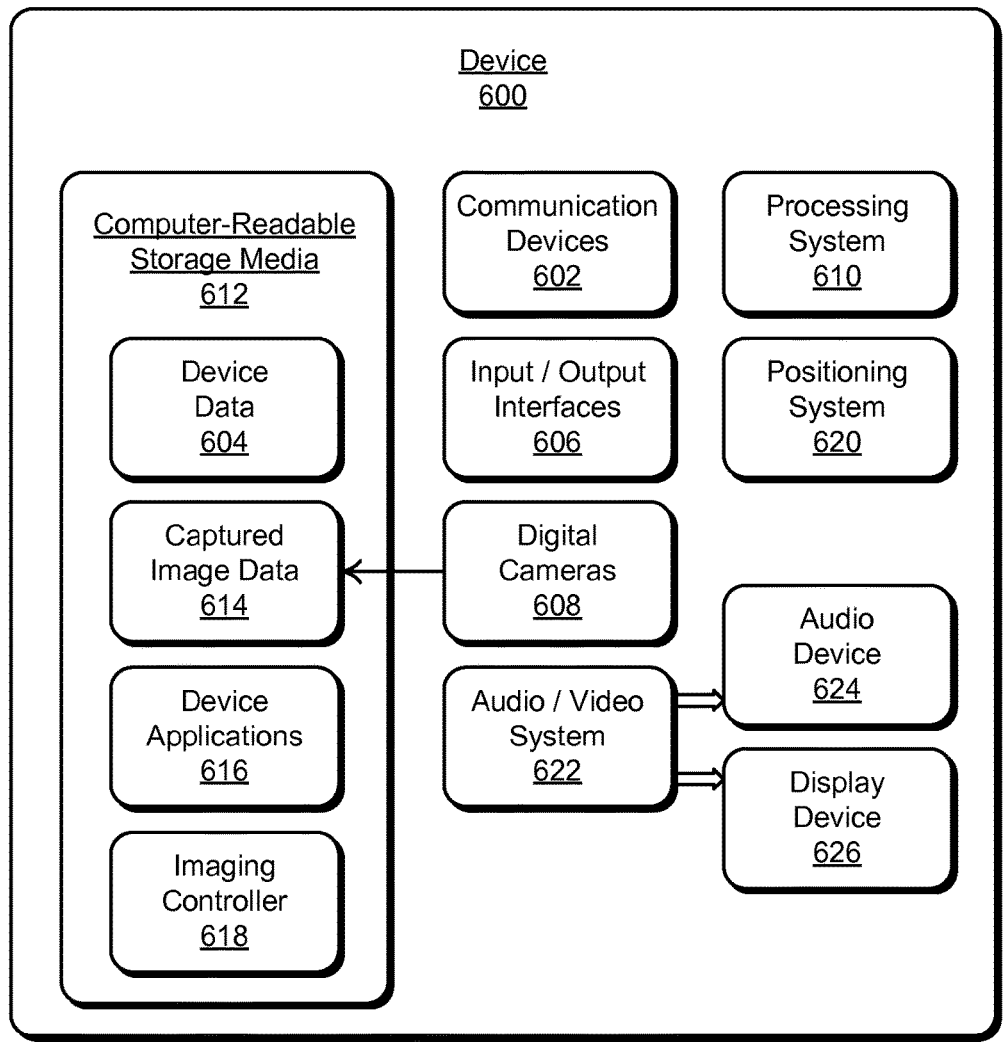
FIG. 6 illustrates various components of an example device that can implement embodiments of an auto-stereoscopic augmented reality display.

FIG. 6 illustrates various components of an example device 600 that can be implemented as any of the devices described with reference to the previous FIGS. 1-5, such as the computing device 102 that implements the auto-stereoscopic augmented reality display 104. In embodiments, the device 600 may be implemented as any type of client device, mobile phone, tablet, computing, communication, entertainment, gaming, media playback, and/or other type of device.

The device 600 includes communication devices 602 that enable wired and/or wireless communication of device data 604, such as virtual image data, video and image data, and other media content stored on the device. The device data can include any type of audio, video, and/or image data. The communication devices 602 can also include transceivers for cellular phone communication and/or for network data communication.

The device 600 also includes input/output (I/O) interfaces 606, such as data network interfaces that provide connection and/or communication links between the device, data networks, and other devices. The I/O interfaces can be used to couple the device to any type of components, peripherals, and/or accessory devices, such as digital cameras 608 that may be integrated with device 600. The I/O interfaces also include data input ports via which any type of data, media content, and/or inputs can be received, such as user inputs to the device, as well as any type of audio, video, and/or image data received from any content and/or data source.

The I/O interfaces 606 also support natural user interface (NUI) inputs to the device 600, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 600 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 600 may further include any type of a system bus or other data and command transfer system that couples the various components within the device. A system bus can include any one or combination of different bus structures and architectures, as well as control and data lines.

The device 600 also includes computer-readable storage media 612, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 612 provides storage of the device data 604, captured image data 614 from the digital cameras 608, and various device applications 616, such as an operating system that is maintained as a software application with the computer-readable storage media and executed by the processing system 610. In this example, the device applications also include an imaging controller 618 that implements embodiments of an auto-stereoscopic augmented reality display, such as when the example device 600 is implemented as the computing device 102. Examples of the imaging controller 618 include the imaging controller 308 implemented at the computing device 102 as described with reference to FIG. 3. The device 600 can also include a positioning system 620, such as a GPS transceiver, or similar positioning system components, that can be utilized to determine a global or navigational position of the device.

The device 600 also includes an audio and/or video system 622 that generates audio data for an audio device 624 and/or generates display data for a display device 626. In embodiments, the display device 626 can be implemented as an auto-stereoscopic augmented reality display. The audio device and/or the display device include any devices that process, display, and/or otherwise render audio, video, display, and/or image data, such as a virtual image that is displayed for viewing. In implementations, the audio device and/or the display device are integrated components of the example device 600. Alternatively, the audio device and/or the display device are external, peripheral components to the example device.

Although embodiments of an auto-stereoscopic augmented reality display have been described in language specific to features and/or methods, the appended claims are not necessarily limited to the specific features or methods described. Rather, the specific features and methods are disclosed as example implementations of an auto-stereoscopic augmented reality display.

The invention claimed is:

1. An imaging structure implemented in a display device, the imaging structure comprising:
   a waveguide configured for see-through viewing of an environment, the waveguide further configured to transmit light of a virtual image that is generated as a near-display object to appear at a distance in the environment when the environment is viewed through the waveguide;
   one or more sensors configured to provide reference data related to at least a position and an orientation of the imaging structure in the environment with respect to a real object in the environment; and
   switchable diffractive elements integrated in the waveguide and configured in display zones of the display device, the display zones including vector adjustments, based in part on the reference data, to account for the position and the orientation of the imaging structure and enable the virtual image that appears at the distance in the environment to be generated with an accurate viewing angle relative to a viewing angle of the real object in the environment, the switchable diffractive elements switchable to independently activate the display zones to correct for an accurate stereopsis view of the virtual image that appears at the distance in the environment,
   wherein:
     one or more first display zones can be activated to provide a representation of the virtual image for a right eye of a user based on tracked pupil positions of the user, one or more second display zones can be activated to provide a different representation of the virtual image for a left eye of the user based on the tracked pupil positions of the user, and
     the one or more first display zones and the one or more second display zones are determined by calculating a ray-trace bisector for each of one or more tiles of the display device relative to a current bisector eye position.

2. An imaging structure as recited in claim 1, further comprising an element drive circuit that is controllable to selectively activate the switchable diffractive elements in respective display zones to project the virtual image for display.

3. An imaging structure as recited in claim 1, wherein the switchable diffractive elements in a display zone are configured for activation based on an eye distance of the user from the imaging structure and viewing angles of the right eye and the left eye to a center of the imaging structure.

4. An imaging structure as recited in claim 1, wherein the switchable diffractive elements are configured in sets of stacked elements, and each switchable diffractive element in a set of stacked elements is configured to diffract the light of the virtual image in a different field of view.

5. An imaging structure as recited in claim 4, wherein the different fields of view projected by each of the switchable diffractive elements in the set of stacked elements combine for a sequential field of view that spans an activated display zone.

6. An imaging structure as recited in claim 1, wherein the switchable diffractive elements comprise Switchable Bragg Gratings.

7. A computing device, comprising:
   a see-through display device configured as an auto-stereoscopic augmented reality display to display a virtual image as a near-display object that appears at a distance in an environment that is viewable through the see-through display device;
   one or more sensors configured to provide reference data related to at least a position and an orientation of the see-through display device in the environment with respect to a real object in the environment; and
   a processing system to implement an imaging controller that is configured to control activation of switchable diffractive elements configured in display zones of the see-through display device, the display zones of the see-through display device including vector adjustments, based in part on the reference data, to account for the position and the orientation of the see-through display device and enable the virtual image that appears at the distance in the environment to be generated with an accurate viewing angle relative to a viewing angle of the real object in the environment, and the display zones independently controllable to correct for an accurate stereopsis view of the virtual image that appears at the distance in the environment, the see-through display device configured to activate one or more first display zones to display a representation of the virtual image for a right eye of a user based on tracked pupil positions of the user, and activate one or more second display zones to display a different representation of the virtual image for a left eye of a user based on the tracked pupil positions of the user,
   wherein the one or more first display zones and the one or more second display zones are determined by calculating a ray-trace bisector for each of one or more tiles of the see-through display device relative to a current bisector eye position.

8. A computing device as recited in claim 7, further comprising:
   a camera configured to capture digital images of the left and right eyes of the user of the computing device and wherein pupil positions of the left and right eyes are tracked based on the digital images of the left and right eyes of the user.

9. A computing device as recited in claim 8, wherein a distance from the left and right eyes to the see-through display device is determined and viewing angles of the left and right eyes to a center of the see-through display device are determined.

10. A computing device as recited in claim 9, wherein the imaging controller is configured to control activation of the switchable diffractive elements in a display zone based on the pupil positions of the left and right eyes, the distance from the left and right eyes to the see-through display device, and the viewing angles of the left and right eyes to the center of the see-through display device.

11. A computing device as recited in claim 7, further comprising an element drive circuit configured to selectively activate the switchable diffractive elements in the display zones of the see-through display device based on imaging controller inputs.

12. A computing device as recited in claim 7, wherein the switchable diffractive elements are configured in sets of stacked elements integrated in the see-through display device, and each switchable diffractive element in a set of stacked elements is configured to diffract light of the virtual image in a different field of view.

13. A computing device as recited in claim 12, wherein the different fields of view projected by each of the switchable diffractive elements in the set of stacked elements combine for a sequential field of view that spans an activated display zone.

14. A computing device as recited in claim 7, wherein the switchable diffractive elements comprise Switchable Bragg Gratings.

15. A method, comprising:
    generating a virtual image for display on a see-through display device;
    displaying the virtual image as a near-display object that appears at a distance in an environment that is viewable through the see-through display device;
    controlling activation of switchable diffractive elements configured in display zones of the see-through display device, the display zones independently controllable to correct for an accurate stereopsis view of the virtual image that appears at the distance in the environment, the controlling activation further comprising:
    tracking pupil positions of left and right eyes of a user; and
    controlling at least one of the display zones to be switched on to provide a representation of the virtual image for the right eye of the user based on the pupil positions and controlling at least one other of the display zones to be switched on to provide a different representation of the virtual image for a left eye of the user based on the pupil positions,
    wherein the at least one of the display zones and the at least one other of the display zones are determined by calculating a ray-trace bisector for each of one or more tiles of the see-through display device relative to a current bisector eye position.

16. A method as recited in claim 15, wherein the tracking pupil positions of the left and right eyes of the user is based on digital images that capture user eye position, and wherein the method further comprises:
    determining a distance from the left and right eyes to the see-through display device; and determining viewing angles of the left and right eyes to a center of the see-through display device.

17. A method as recited in claim 16, wherein activation of the switchable diffractive elements in a display zone is controlled based on the pupil positions of the left and right eyes, the distance from the left and right eyes to the see-through display device, and the viewing angles of the left and right eyes to the center of the see-through display device.

18. A method as recited in claim 15, further comprising:
    generating a sequential field of view that spans an activated display zone, the sequential field of view said generated from a combination of different fields of view that are each projected by respective switchable diffractive elements in sets of stacked elements.

19. A method as recited in claim 15, wherein the controlling activation further comprises controlling at least one of the display zones to be switched off based on the pupil positions.

* * * * *